(12) United States Patent
Miller

(10) Patent No.: US 6,575,491 B2
(45) Date of Patent: Jun. 10, 2003

(54) VERSATILE CART FOR TRANSPORTING PACKAGES TO A VEHICLE

(76) Inventor: Timothy J. Miller, 318 Lakewood Cir., Greer, SC (US) 29651

( * ) Notice: Subject to any disclaimer, the term of this patent is extended or adjusted under 35 U.S.C. 154(b) by 13 days.

(21) Appl. No.: 09/833,501

(22) Filed: Apr. 11, 2001

(65) Prior Publication Data

US 2002/0149176 A1 Oct. 17, 2002

(51) Int. Cl.$^7$ .............................. B62B 3/02; A61G 1/02
(52) U.S. Cl. ....................... 280/638; 280/640; 280/651; 280/43.17; 5/620; 5/627; 5/86.1; 296/20
(58) Field of Search ................. 280/638, 639, 280/640, 38, 641, 651, 43, 43.17, 43.21; 5/620, 625, 626, 627, 629, 86.1, 11, 611; 296/20

(56) References Cited

U.S. PATENT DOCUMENTS

| | | | | |
|---|---|---|---|---|
| 1,370,732 A | * | 3/1921 | Corbett .................... 108/36 |
| 3,057,655 A | * | 10/1962 | Weil et al. ................. 296/20 |
| 3,223,429 A | * | 12/1965 | Hastings .................. 280/641 |
| 3,493,262 A | * | 2/1970 | Ferneau .................... 296/20 |
| 3,637,232 A | * | 1/1972 | Bourgraf et al. ........... 280/641 |
| 3,759,565 A | * | 9/1973 | Ferneau .................... 296/20 |
| 3,980,334 A | * | 9/1976 | Ferneau et al. ............. 296/20 |
| 4,019,244 A |   | 4/1977 | Roberts ............... 224/42.42 R |
| 4,192,541 A | * | 3/1980 | Ferneau .................... 296/20 |
| 4,682,810 A | * | 7/1987 | Zarka ..................... 296/20 |
| 4,921,295 A | * | 5/1990 | Stollenwerk ............... 296/20 |
| 5,083,625 A | * | 1/1992 | Bleicher ................. 180/65.1 |
| 5,084,922 A | * | 2/1992 | Louit ..................... 5/86.1 |
| 5,129,612 A |   | 7/1992 | Beaupre .................... 248/166 |
| 5,238,256 A |   | 8/1993 | Ondrasik ............... 280/33.991 |
| 5,509,159 A | * | 4/1996 | Du-Bois .................... 5/627 |
| 5,649,718 A | * | 7/1997 | Groglio ................... 280/641 |
| 5,669,090 A | * | 9/1997 | Basgall .................... 5/620 |
| 6,056,178 A |   | 5/2000 | Rapp-Duncan ............ 224/411 |
| 6,070,899 A | * | 6/2000 | Gines .................... 280/651 |
| 2001/0052680 A1 | * | 12/2001 | Bennington | |

OTHER PUBLICATIONS

Salesmaker Carts; http://www.professionalcarts.com/289.html; printed Mar. 12, 2001.

* cited by examiner

*Primary Examiner*—Paul N. Dickson
*Assistant Examiner*—Laura B. Rosenberg
(74) *Attorney, Agent, or Firm*—Joseph T. Guy; Nexsen Pruet Jacobs & Pollard, LLC

(57) ABSTRACT

Described is a collapsible cart for transporting items from a first surface to a raised surface. The collapsible cart comprises a platform, for carrying items thereon, wherein the platform comprises a front edge and a back edge. A collapsible front leg is attached to the platform. The collapsible front leg comprises an front upper leg and a front lower leg. Connected to the front upper leg and to the front lower leg is a spring biased to rotate the front lower leg towards an extended position relative to the front upper leg. A front release mechanism persuades the collapsible front legs to be withdrawn towards the platform. A collapsible rear leg is also attached to the platform. The collapsible rear leg comprises a rear upper leg, a rear lower leg and a spring connected there between biased to rotate the rear lower leg towards an extended position relative to the rear upper leg. A rear release mechanism allows the collapsible rear leg to be withdrawn towards the platform.

18 Claims, 12 Drawing Sheets

VERSATILE CART FOR TRANSPORTING PACKAGES TO A VEHICLE

TECHNICAL FIELD

The present invention is related to a cart for use in transporting packages, particularly for transporting packages to and in a vehicle. More specifically, the present invention is related to a cart which transports goods and which collapses, or folds, to form a platform in a vehicle.

BACKGROUND

The use of shopping carts is well known as are carts which can collapse for storage in a vehicle.

Shopping carts are characterized by their use wherein the groceries, or other goods, are selected and placed in the shopping cart for transport to a check out station. After scanning, or otherwise paying for the groceries, the cart is moved to the vehicle wherein the groceries are removed and placed in the vehicle. After arriving at the final destination the groceries are removed from the vehicle and transported into the location of eventual use. This requires the groceries to be handled multiple times which is inefficient and a burden especially to the elderly or those with infirmities.

Collapsible carts are an improvement but they still require the groceries to be removed from the cart prior to being placed in the vehicle. Once arriving at the final destination the groceries are reloaded into the collapsible cart for transport into the location of eventual use. This does not alleviate the problem associated with multiple transfer of groceries or packages.

There has been a long felt desire in the art for a cart which is easily transported through a store, or the like, but which can be easily rolled into the back of a vehicle without removing the contents therein. A particular concern with existing carts of this nature is the inability of the cart to remain level as the cart enters the vehicle. If the cart tilts the groceries may be upended which is highly undesirable.

SUMMARY

It is an object of the present invention to provide a cart which facilitates transporting items from one surface to a raised surface, while allowing the rolling mechanism to conveniently fold, without the items being removed from the cart.

It is another object of the present invention to provide a cart which can be rolled into the storage area of a vehicle thereby eliminating the necessity of unloading the cart.

A particular feature of the present invention is the compact design which is aesthetically pleasing and functional.

These and other features, as will be realized from the description herein, are provided in a collapsible cart for transporting items from a first surface to a raised surface. The collapsible cart comprises a platform, for carrying items thereon, wherein the platform comprises a front edge and a back edge. A collapsible front leg is attached to the platform. The collapsible front leg comprises an front upper leg and a front lower leg. Connected to the front upper leg and to the front lower leg is a spring biased to rotate the front lower leg towards an extended position relative to the front upper leg. A front release mechanism persuades the collapsible front legs to be withdrawn towards the platform. A collapsible rear leg is also attached to the platform. The collapsible rear leg comprises a rear upper leg, a rear lower leg and a spring connected there between biased to rotate the rear lower leg towards an extended position relative to the rear upper leg. A rear release mechanism allows the collapsible rear leg to be withdrawn towards the platform.

Another embodiment is provided in a collapsible cart for transporting items to a raised surface. The collapsible cart comprises a platform with a front edge and a back edge. A collapsible front leg is attached to the platform wherein the collapsible front leg comprises an front upper leg pivotally attached to the platform and a front lower leg pivotally attached to the front upper leg. A front release mechanism allows the front upper legs to rotate towards the front edge with the front lower leg extended therefrom. The front lower leg rotates opposite the front upper leg when the front lower leg contacts the raised surface. A collapsible rear leg is also attached to the platform wherein the collapsible rear leg comprises an rear upper leg pivotally attached to the platform and a rear lower leg pivotally attached to the rear upper leg. A rear release mechanism allows the rear upper leg to rotate towards the front edge of the platform with the rear lower leg extended therefrom. The rear lower leg rotates opposite the rear upper leg the rear lower leg contacts the raised surface.

Yet another embodiment is provided in a cart for transporting items to a raised surface. The cart comprises a platform with side rails preferably attached to the platform. Collapsible front legs are attached to the platform wherein the collapsible front legs comprises a front upper portion a front lower portion telescopically attached to the front upper portion and a front release mechanism for allowing the front lower portion to be withdrawn into the front upper portion. A collapsible rear leg is attached to the platform wherein the collapsible rear leg comprises a rear upper portion, a rear lower portion telescopically attached to the rear upper portion and a rear release mechanism for allowing the rear lower portion to be withdrawn into the rear upper portion.

Yet another embodiment is a method for transporting items in a cart wherein the cart is capable of moving from a lower surface to a raised surface. The method comprises the steps of:

a) pushing the cart towards a raised surface;
b) activating a controller for withdrawing a pair of front legs attached to the cart wherein the cart is partially supported on the raised surface;
c) pushing the cart further onto the raised surface; and
d) activating a controller for withdrawing a pair of rear legs attached to the cart wherein the cart is supported by the raised surface.

DETAILED DESCRIPTION

Figure 1:
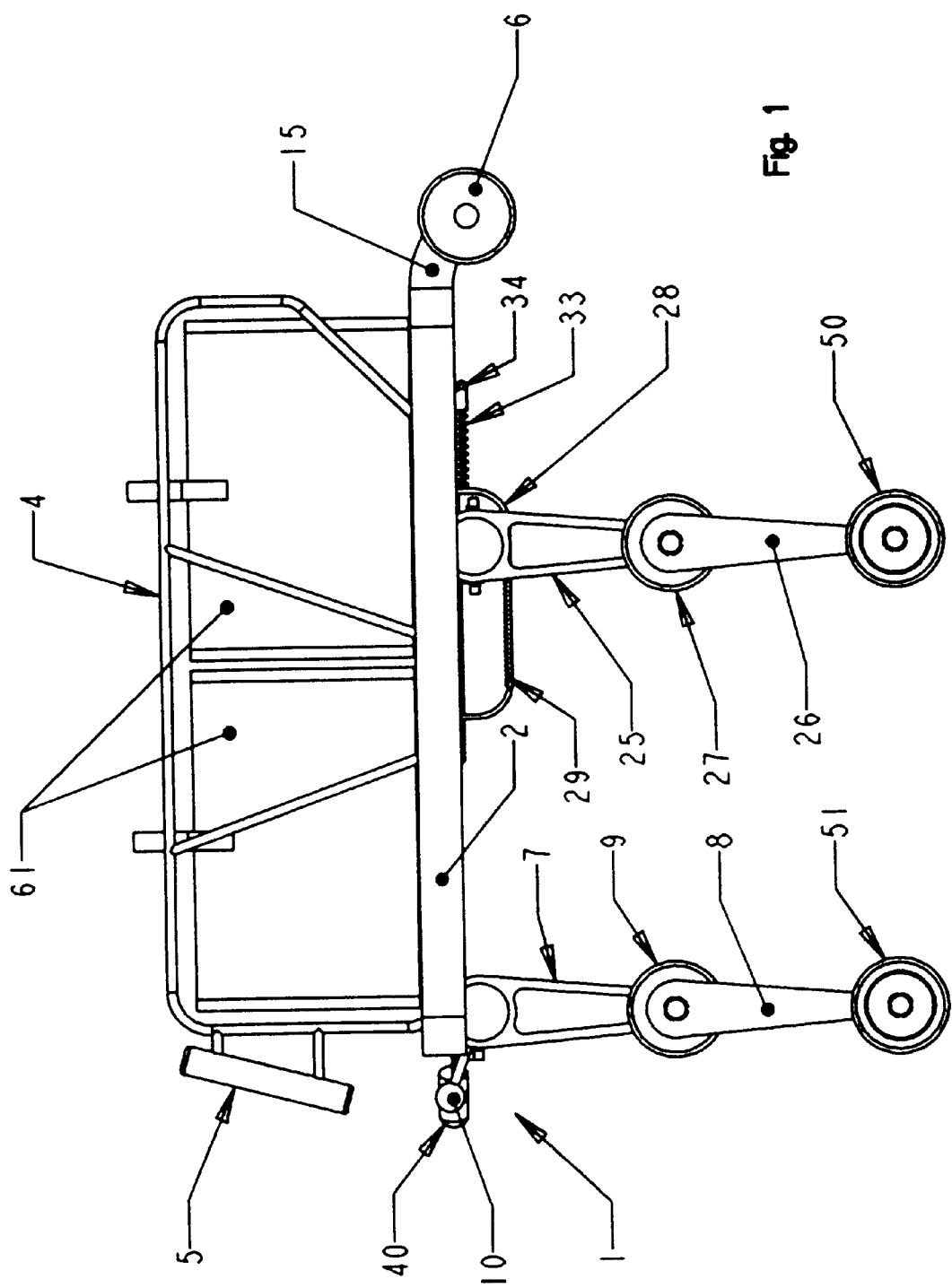
FIG. 1 is a side view of an embodiment of the present invention.
Figure 2:
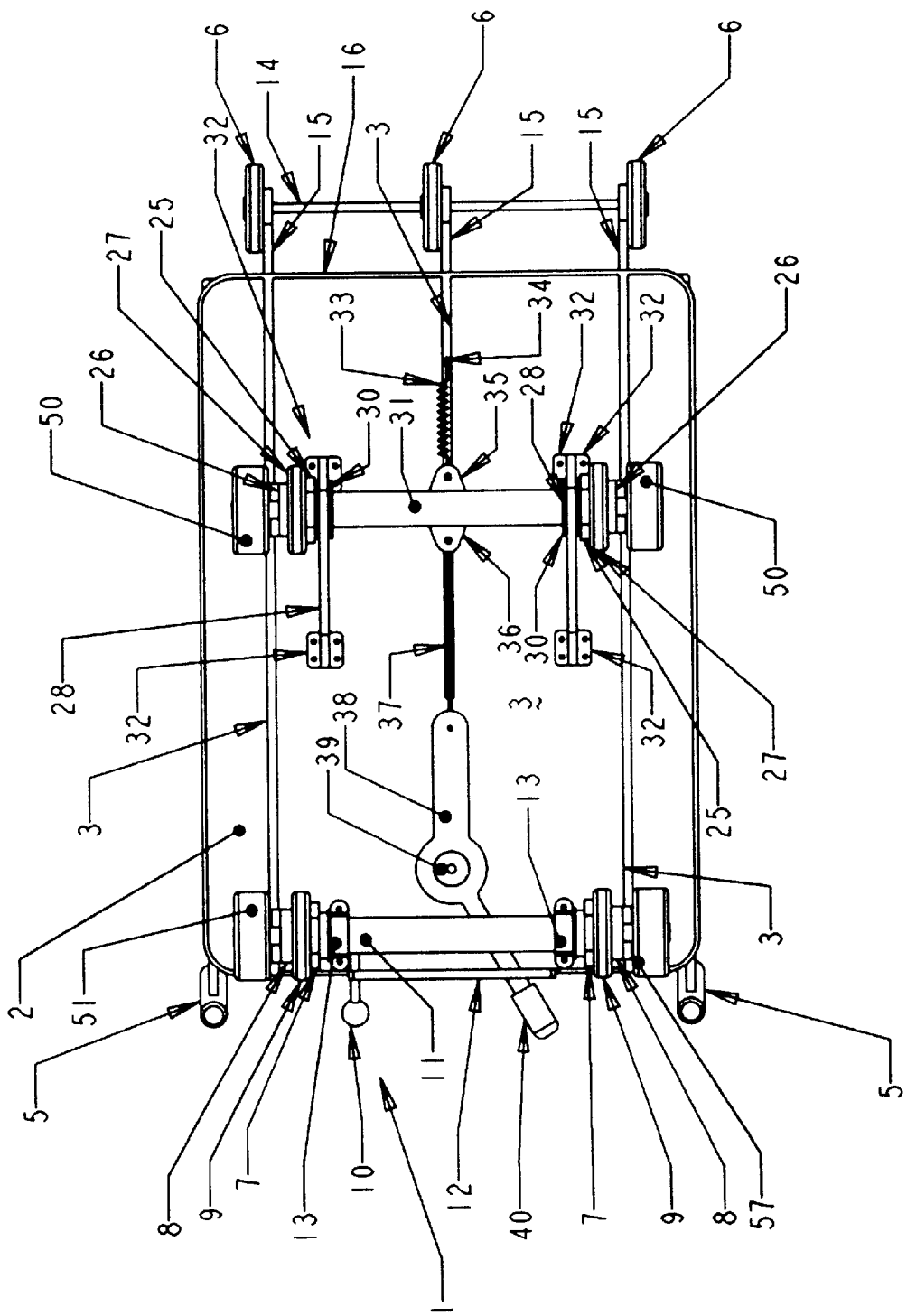
FIG. 2 is a bottom view of the embodiment of FIG. 1.
Figure 3:
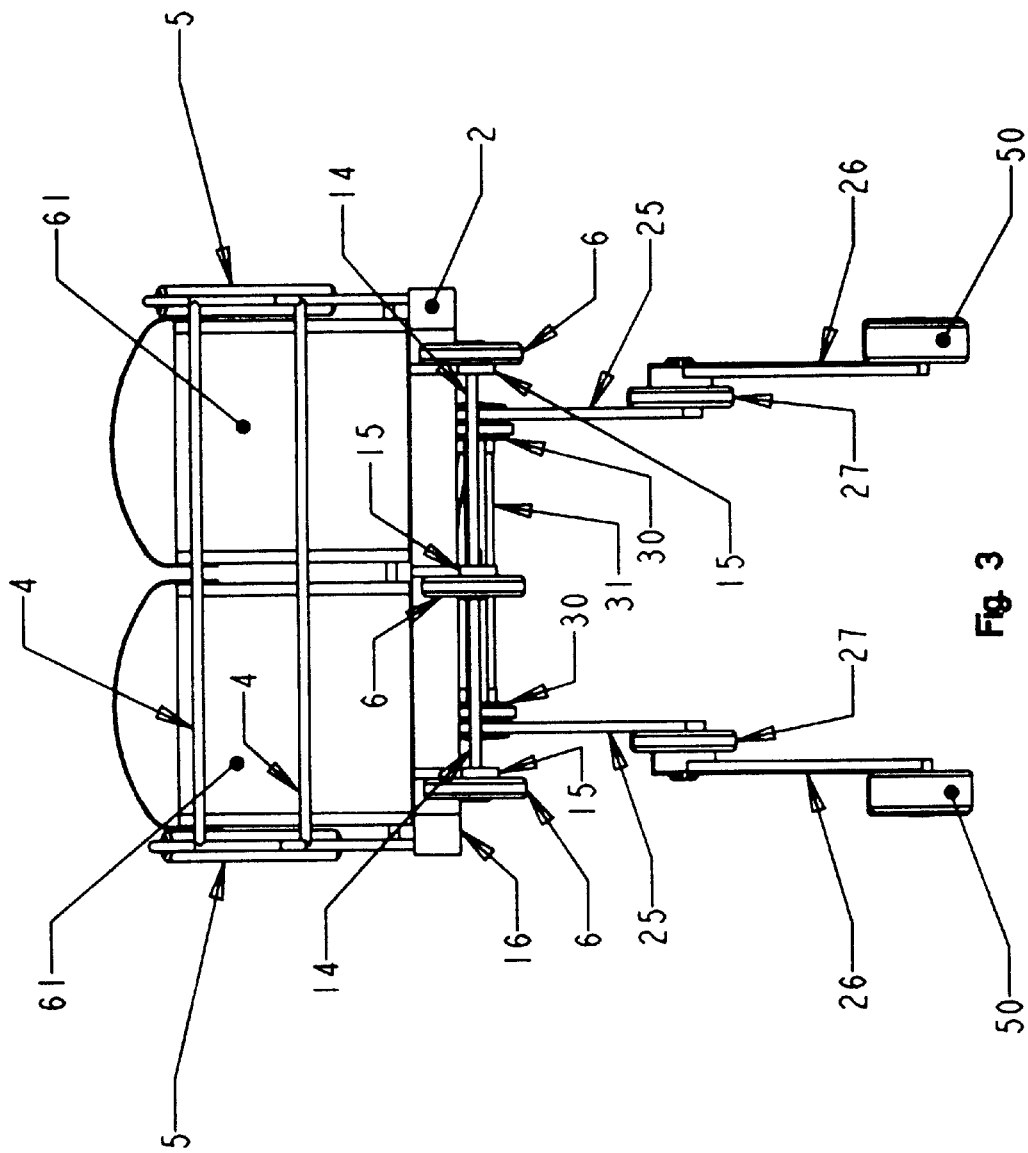
FIG. 3 is a front view of the embodiment of FIG. 1.
Figure 4:
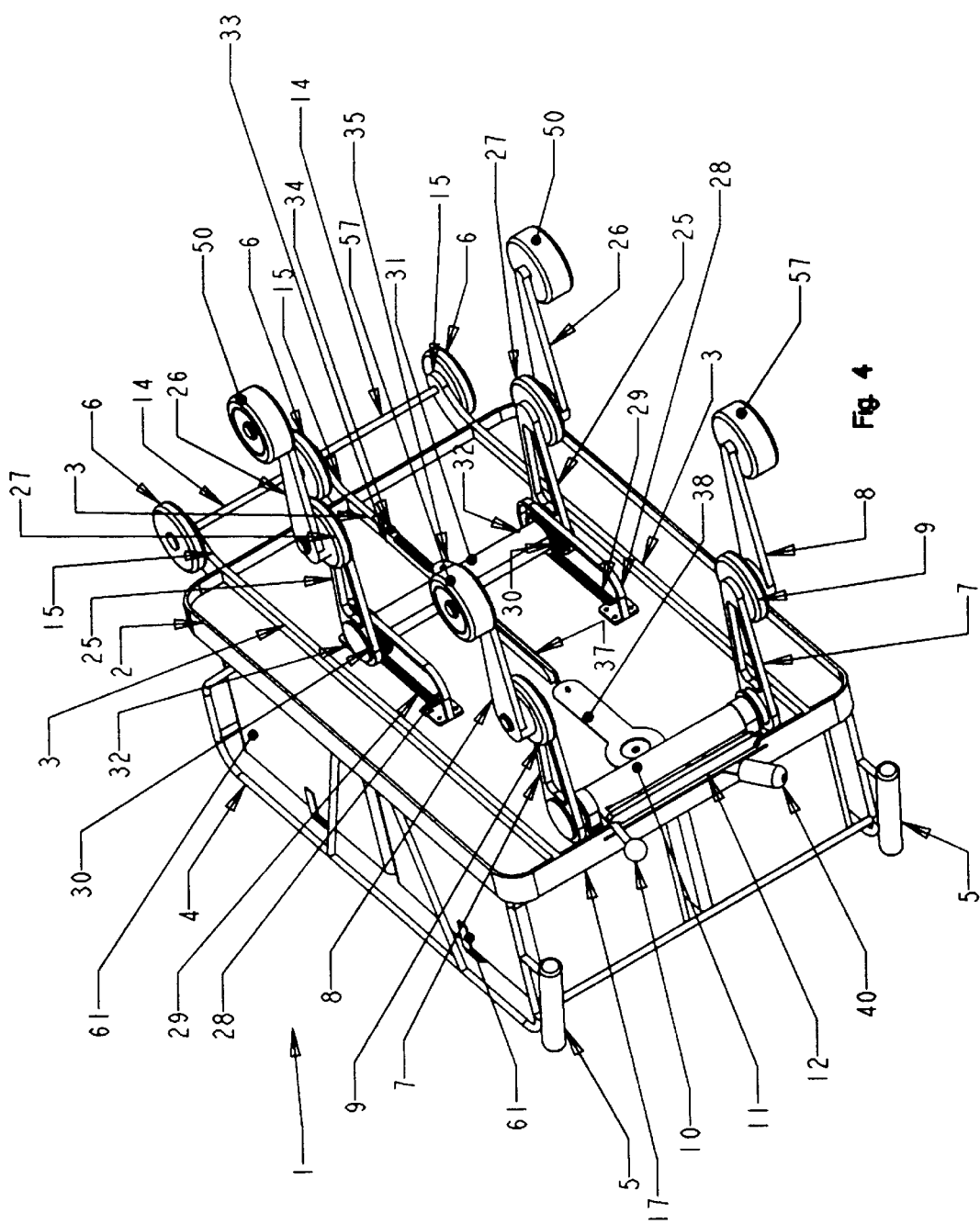
FIG. 4 is a bottom perspective view of the embodiment of FIG. 1

The invention will be described with reference to the drawings wherein similar elements are numbered accordingly.

An embodiment of the collapsible cart will be described with particular reference to FIGS. 1–4. The collapsible cart, generally represented at 1, is shown in side view in FIG. 1, in bottom view in FIG. 2, in front view in FIG. 3 and in bottom perspective view in FIG. 4. The cart comprises a platform, 2, upon which groceries, or other items being transported rest. The platform comprises a front edge, 16, and back edge, 17. The front edge and back edge are defined to be opposite to each other. For convenience, the front edge generally refers to the edge which enters the vehicle, or raised platform, first. Raised ribs, 3, on the platform bottom are optionally provided to increase the strength of the platform. The platform is generally rectangular in shape with a size chosen based on the application. For example, if a collapsible cart is to be utilized with a specific vehicle it may be sized to optimize space in the specific vehicle. The platform can be manufactured from any material common to the manufacture of grocery carts. Metals, such as aluminum, wood, plastics and composites are considered to be particularly well suited for use in the manufacture of the platform.

Attached to the upper side of the platform is a rail, 4, which forms a cargo area and prohibits items from falling from the platform. The rail, 4, is shown to comprise pipes yet other rails could be utilized as would be realized in the art. Particularly contemplated are rails comprising cloth walls with a support structure enclosed therein. A grid pattern, mesh pattern, or solid rail is also within the scope of the present invention. The rail can be manufactured from metal, wood, fabric or synthetic materials such as plastics, and the like. It would be apparent to a skilled artisan that various devices can be attached to the rails for securing cargo without departing from the scope of the invention. It would also be apparent that the rail could be designed for removal or it could be collapsible as would be within the ability of a skilled artisan. In one embodiment the platform and rails may be integral and formed in a common molding step.

Attached to the collapsible cart are optional, but preferred, handles, 5. The handles may be attached to the rail as shown, directly to the platform, or to other locations depending on the preferred height of the collapsible cart and design aesthetics.

At least one roller, 6, pivotally attached to the front of the collapsible cart, allows the cart to be easily entered into a vehicle or onto the raised surface. The height of the rollers may be chosen such that the platform can be supported by the vehicle while the legs are retracted as will be described in further detail below. The rollers are preferably rotatably attached to an axle, 14, which is secured to the collapsible cart by protrusions, 15. The protrusions are preferably integral to the platform, 2.

A pair of rear legs are pivotally attached to the rear of the platform, 2. The rear legs comprise a rear upper leg, 7, and a rear lower leg, 8. The rear upper leg, 7, is pivotally attached to the platform, 2. The rear lower leg, 8, is pivotally attached to the rear upper leg with a rear spring assembly, 9, attached there between. The rear spring assembly will be more fully described below. The pair of rear upper legs are attached to a rear axle, 11, such that both legs move in concert. A rear release handle, 10, is attached to the rear axle and movement of the rear release handle causes the rear axle to rotate thereby rotating the rear upper leg, 7, upwards in an arc towards the front edge, 16, of the collapsible cart. The lower rear leg, 8, then rotates in a counter-rotational direction due to contact with the vehicle thereby persuading the rear lower leg to rotate counter to the bias provided by the spring assembly. The combined action of activating the rear release handle, 10, and contacting the vehicle causes the rear leg to fold bi-directionally and to be withdrawn towards the platform. When the collapsible cart is withdrawn from the vehicle the spring bias of the rear spring assembly, 9, persuades the rear leg to extend parallel to the rear upper leg. The rear release handle, 10, is then manipulated to extend the rear leg downward whereby the platform is supported by the extended legs. A rear release stop, 12, secures the rear release handle in a position corresponding to the rear legs being extended. For the purposes of the present invention the upper leg and lower leg are considered to be fully extended when they are at their longest straight length.

The rear axle, 11, is preferably secured to the platform, 2, by a pair of bearing sleeves, 13. Other methods for rotatably securing the rear axle to the platform could be utilized without departing from the scope of the present invention.

Attached to the front of the collapsible cart is a pair of front legs. The front legs comprise an upper front leg, 25, and a lower front leg, 26. The upper front leg, 25, and lower front leg, 26, are pivotally attached with a front spring assembly, 27, interconnected there between. The front spring assembly will be described in more detail below. The upper front legs, 25, comprise exterior gear teeth, 30, which mate with gear teeth in a track, 28. The upper front legs, 25, are pivotally attached to a front axle, 31. The front axle, 31, is attached to a rear release, 38, by a connector rod, 37, at an attachment lug, 36, secured to the front axle, 31. The front release, 38, is pivotally attached to the platform, 2, at a rear release pivot, 39. As the rear release is persuaded to pivot on the rear release pivot, 39, the axle is persuaded towards the back edge, 17, of the collapsible cart. The meshing track gear teeth and exterior gear teeth cause the upper front leg to rotate towards the front edge, 16, of the collapsible cart. As the upper front legs rotate towards the front edge of the collapsible cart the lower front legs contact the vehicle thereby causing the lower front legs to rotate counter to the rotation of the upper front legs. The front legs are thereby folded under the platform as the collapsible cart enters the vehicle. A front release grip, 40, attached to the rear release is provided for aesthetics and to insure a secure grip. A spring, 33, preferably attached to a rib, 3, by an attachment lug, 34, and to the axle by an axle spring lug, 35, is biased to return the axle to a forward position wherein the upper front legs are extended. As the collapsible cart is withdrawn from the vehicle the upper front leg is persuaded to an extended position by the spring, 33, and the lower front leg is persuaded to extend by the front spring Image Page 2 assembly, 27. The track, 28, is attached to the platform by an attachment tab, 32, or by any other means known in the art. It would be apparent that the present invention allows the upper leg and lower leg to rotate independent of each other which is an improvement in the art wherein the folding of legs is an action done in concert.

The front release, 38, is preferably in the shape of the letter "V" to insure that the available range of motion for the handle is sufficient to cause complete retraction of the The front and rear legs preferably comprise similar elements. In a particularly preferred embodiment the rear upper leg, 7, and the front upper leg, 26, are interchangeable. In a particularly preferred embodiment the rear lower leg, 8, and front lower leg, 26, are interchangeable. In a particularly preferred embodiment the front wheels and rear wheels are interchangeable. In a particularly preferred embodiment the rear spring assembly and front spring assembly are interchangeable. The ability to interchange components decreases the manufacturing cost without departing from the advantageous features of the present invention. It would be within the scope of the present invention to provide distinct features in one or more component.

A locking mechanism to reversibly fix the the lower leg and upper leg in a linear position could be provided as would be realized to one of ordinary skill in the art.

Figure 5:
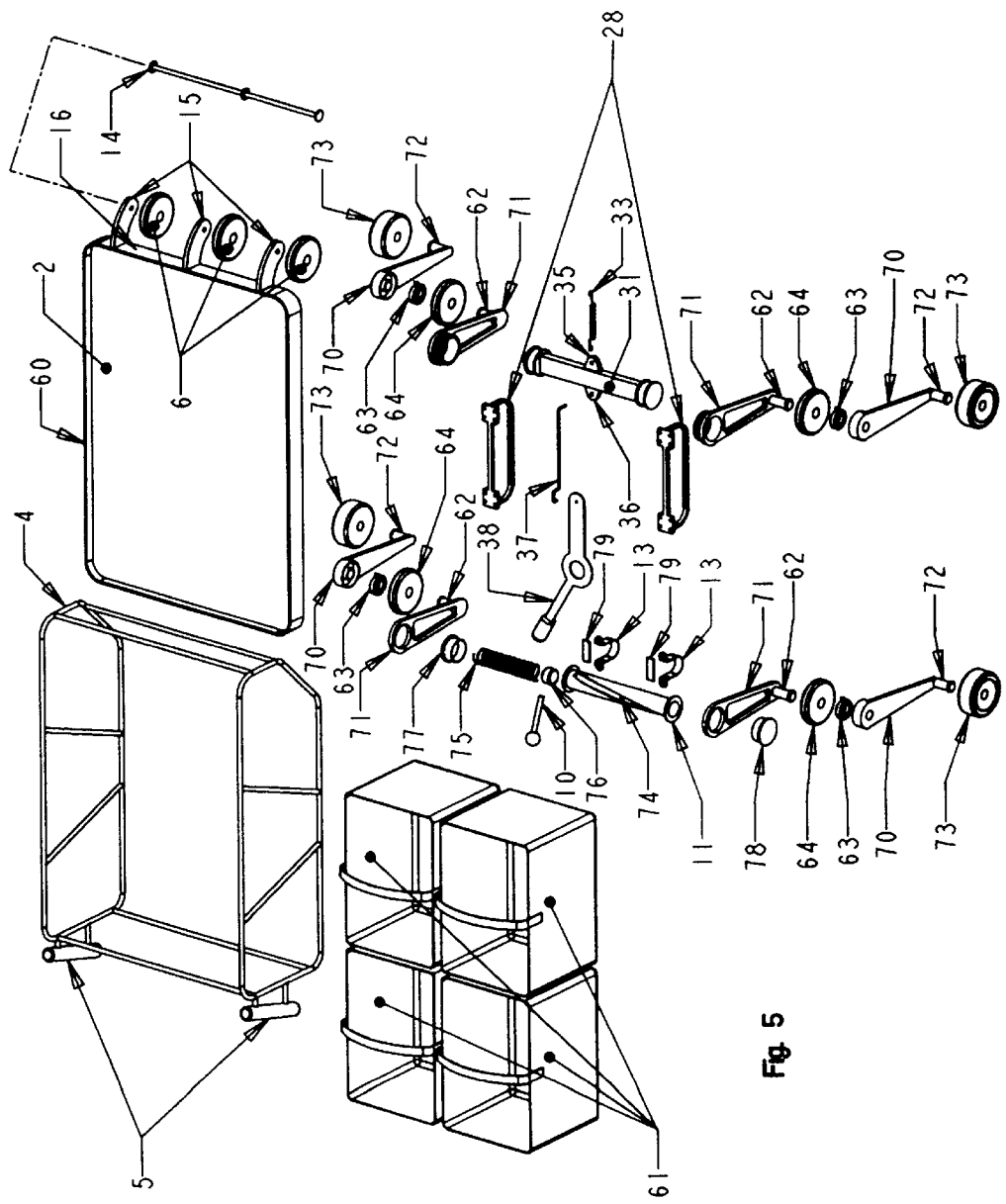
FIG. 5 is an expanded view of an embodiment of the present invention.

An exploded view of the collapsible cart is provided in FIG. 5. The platform, 2, is preferably a rounded rectangle with an optional raised lip, 60, around the periphery. At the front edge of the tray are protrusions, 15, which receive an axle, 14. The axle is received by rollers, 6, as previously described. A rail, 4, and associated handles, 5, are attached to the top of the platform. In one embodiment the rail sits inside the raised lip, 60, and is held in place by gravity. This allows for easy removal of the rail for separate storage. In a particularly preferred embodiment removable carriers, 61, are provided which form compartments. Trays could also be utilized as removable carriers. It is also contemplated that elements which segment the compartment into smaller compartments could be incorporated as would be apparent to one of ordinary skill in the art. The removable carriers may by utilized with the rails or they may sit on the platform and be prohibited from sliding off of the platform by the raised lip.

The lower leg, 70, is pivotally attached to a pin, 62, of the upper leg, 71. The pin, 62, is received by a spring assembly (9 and 27 of FIG. 1) with the spring assembly between the lower leg and upper leg. The spring assembly comprises a coil spring, 63, which has one end affixed to the pin, 62, and the other end affixed to the lower leg, 70. The coil spring is biased to persuade the lower leg to extend from the upper leg. Therefore, as the lower leg is persuaded towards the back edge of the collapsible cart by an external force the bias on the coil spring increases. A coil spring cap, 64, covers the coil spring for aesthetic and safety purposes. The coil spring can be attached to the pin by having the end of the coil spring being received in an indentation or by any method typically employed for attaching a coil spring to an axle or pin received therein. The coil spring can be attached to the lower leg by having a protrusion of the lower leg be received by a "C" shaped bend at the end of the coil or by any other method typically employed in the art of attaching a coil spring to a member.

The lower leg comprises a wheel axle, 72, which is received by the wheel, 73.

The rear axle, 11, preferably comprises a screw slot, 74, which slidably receives the rear release handle, 10. As the rear release handle traverses from side-to-side the rear axle, 11, rotates around the axis and the rear upper legs travel in concert therewith. The rear release handle, 10, engages with a spring cap, 76, which is attached to a spring, 75. The opposite end of the spring is pivotally attached to an end cap, 77. As the rear release handle, 10, traverses laterally the rear axle rotates and the spring is extended. When the rear release handle is released the spring persuades the rear release handle towards a position which corresponds to the legs being extended. A dummy cap, 78, is provided for aesthetics. A bushing, 79, allows smooth rotation by providing a spacer between the platform and rear axle.

Figure 6:
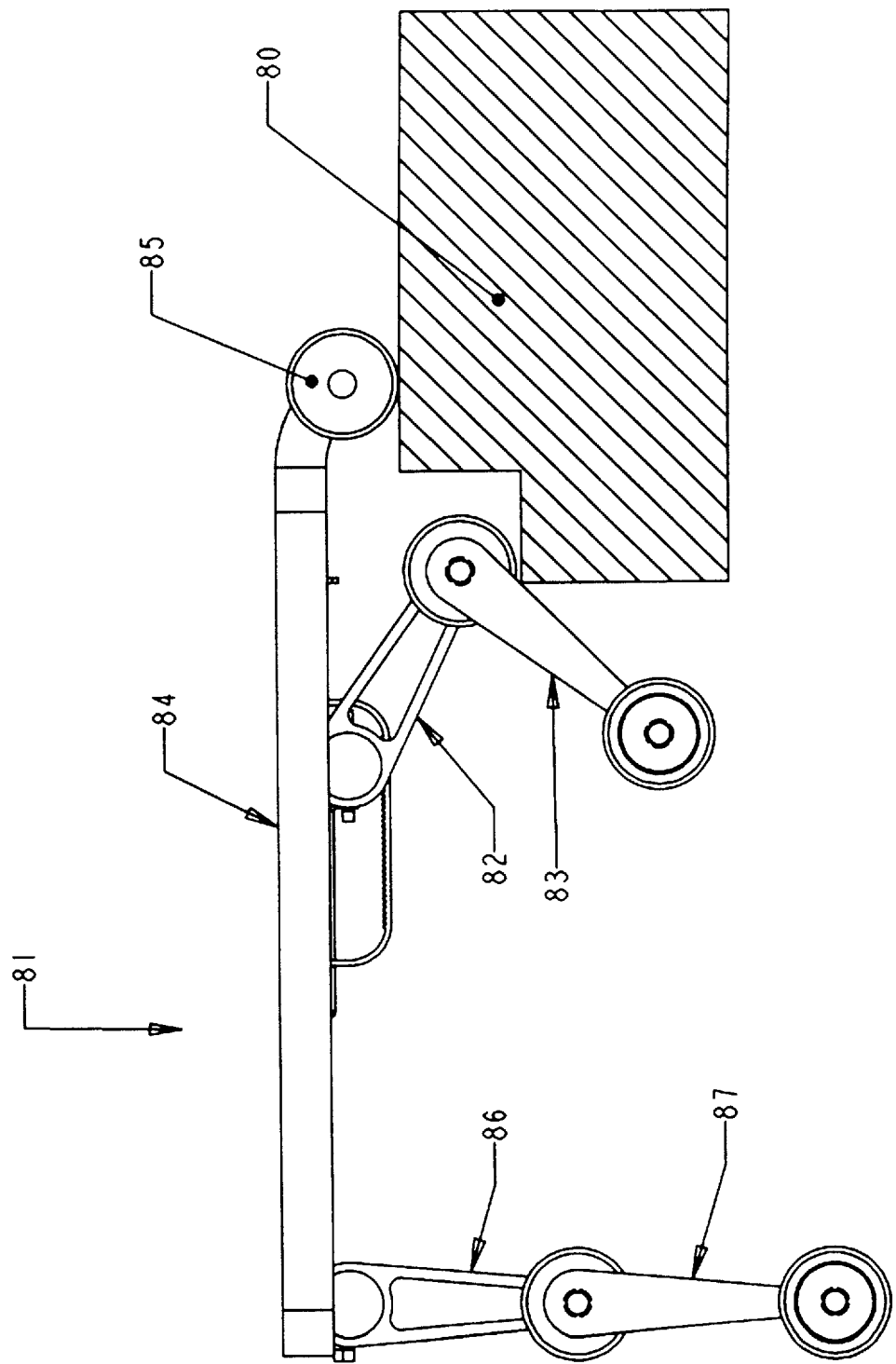
FIG. 6 is a schematic view illustrating the operation of an embodiment of the present invention.

FIG. 6 illustrates an embodiment of the present invention as during use. In FIG. 6, the raised platform, 80, is approached by the collapsible cart, 81. The collapsible cart comprises a front leg comprising an upper front leg, 82, and lower front leg, 83. The upper front leg, 82, is attached to the platform, 84. The lower front leg, 83, is attached to the upper front leg, 82. As the front roller, 85, rolls onto the raised surface, 80, the upper front leg, 82, is pivotally rotated towards the front edge. As the lower front leg, 83, contacts the raised surface the lower front leg rotates towards the back edge and the front leg is thereby withdrawn by the combination or bidirectional folding. The rear legs, comprising a rear upper leg, 86, and rear lower leg, 87, are extended.

Figure 7:
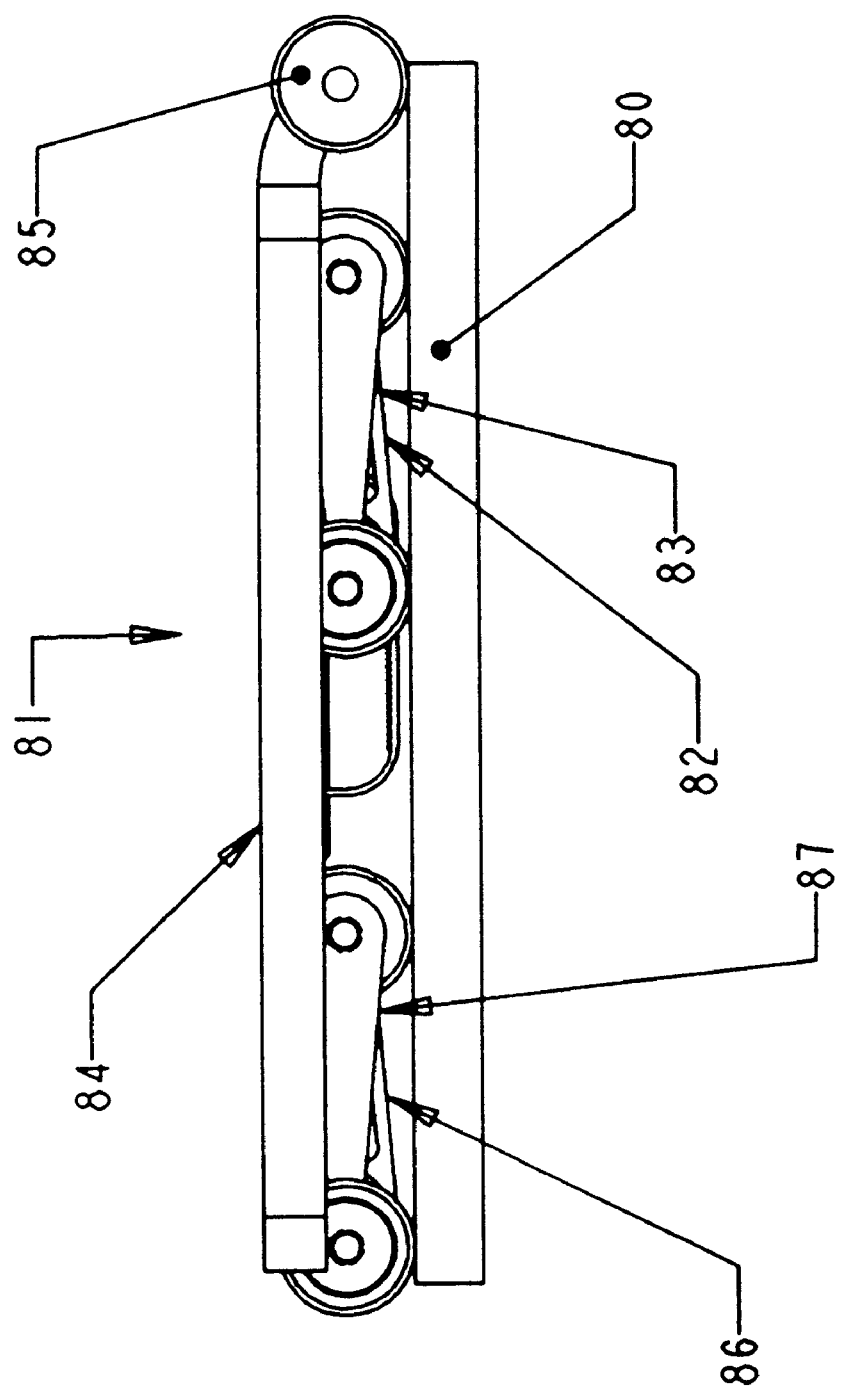
FIG. 7 is a schematic view illustrating the operation of an embodiment of the present invention.

FIG. 7 illustrates an embodiment of the present invention as during use. In FIG. 7, the front legs, and rear legs are withdrawn for storage. The rear upper leg, 86, is withdrawn by rotation towards the front edge. The rear lower leg, 87, contacts the raised surface, 80, thereby causing the rear lower leg to rotate opposite to the rotation of the rear upper leg.

The raised surface, 80, can be any surface on which it is desirable for a cart to be transferred onto. Particularly preferred is a raised surface which is a storage area of a vehicle. In a particularly preferred embodiment the raised surface is a trunk area, storage area or rear area of a vehicle such as a van, a sport utility vehicle, a pickup truck or the like.

Figure 8:
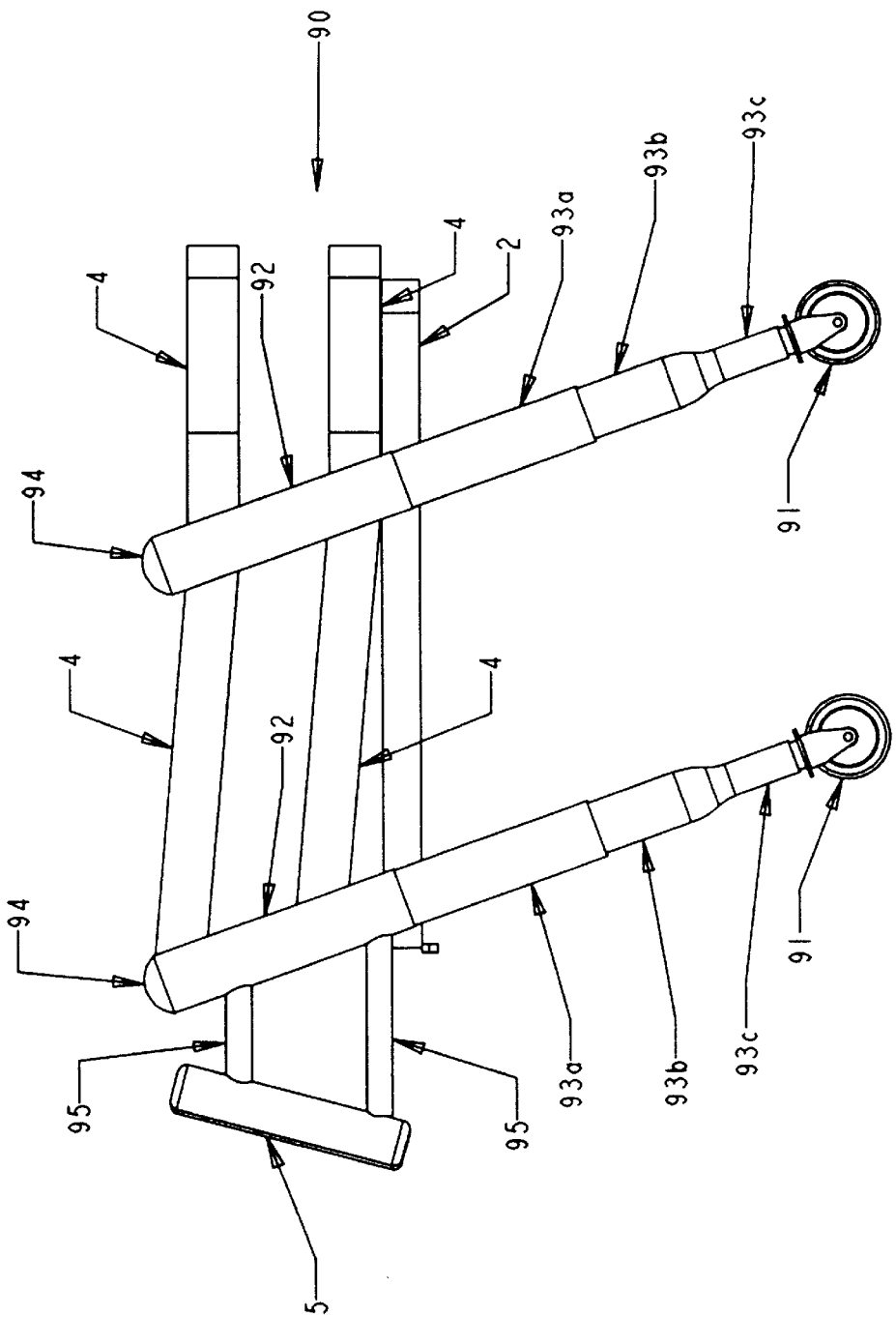
FIG. 8 is a side view of an embodiment of the present invention.
Figure 9:
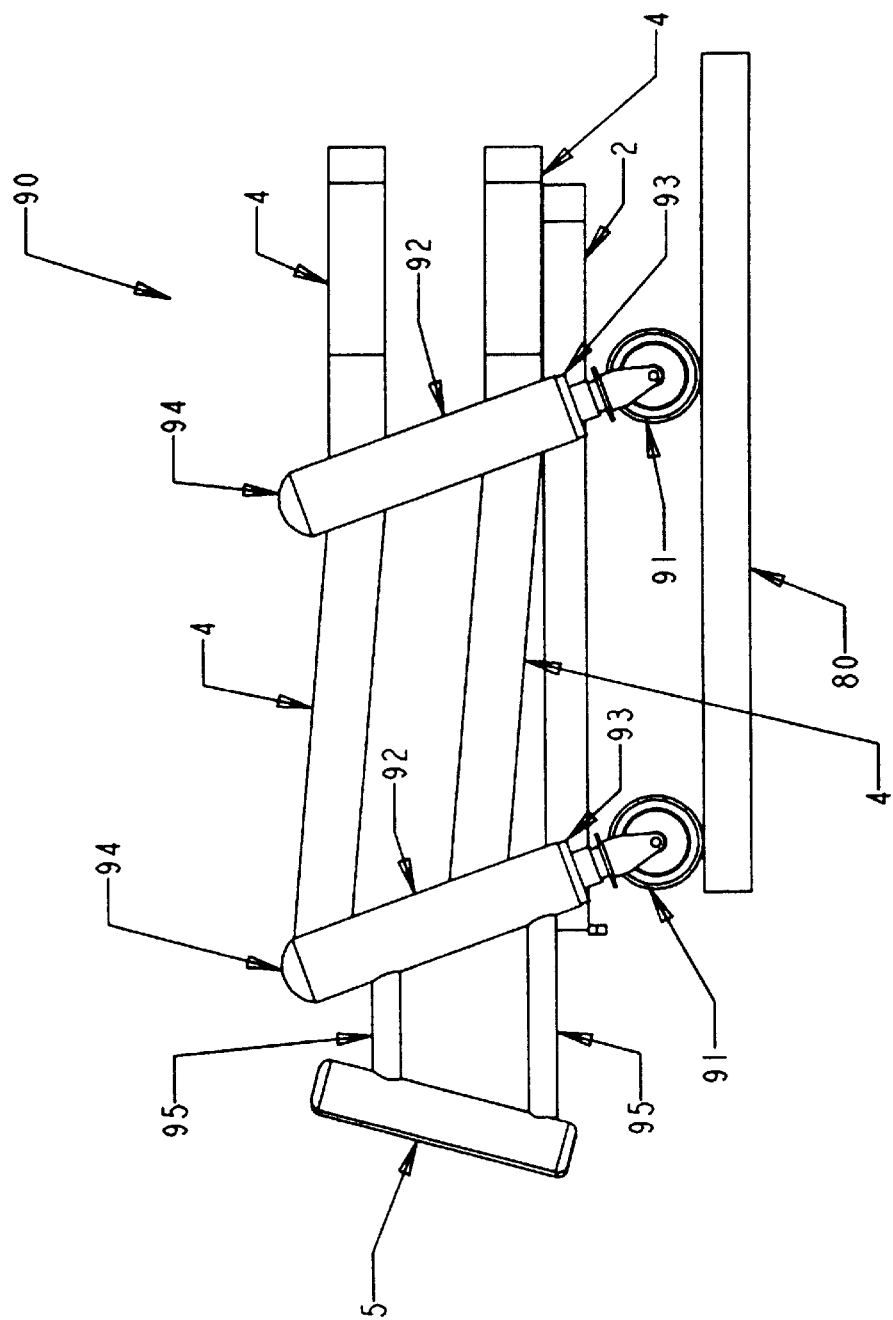
FIG. 9 is a side view of the embodiment of FIG. 8 as it would be visualized during storage.
Figure 10:
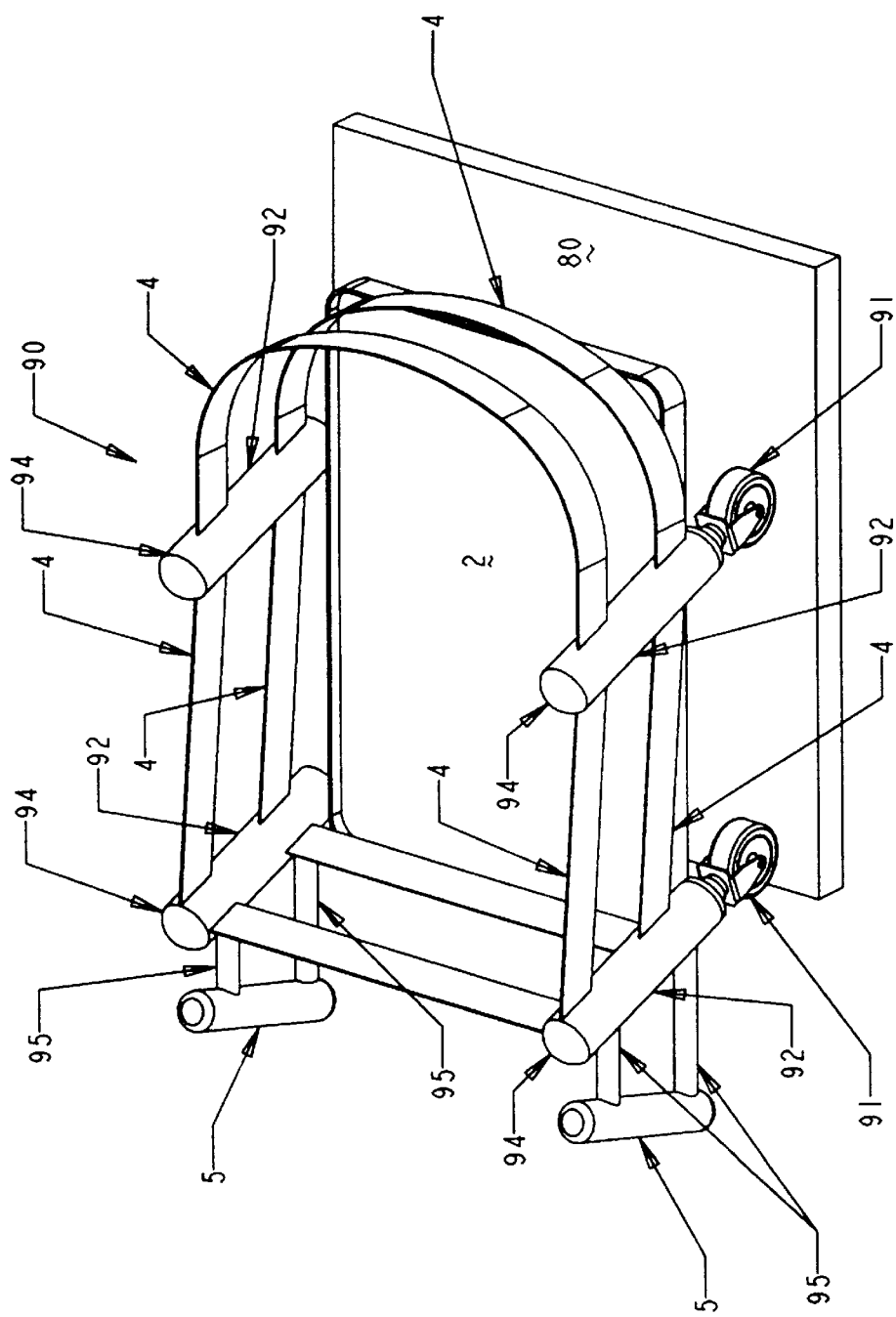
FIG. 10 is a top perspective view of the embodiment of FIGS. 8 and 9 as it would be visualized during storage.

An embodiment of the present invention will be described by referring to FIGS. 8–10. The collapsible cart, generally represented at 90, comprises a platform, 2. Attached the platform is a rail, 4, which preferably circumvents the upper extent of the platform thereby forming a compartment within which materials are transported. The collapsible cart further comprises a multiplicity of hydraulic legs, 92, each of which is capable of withdrawing, or contracting such that the length of the legs can be altered. Each leg comprises a wheel, 91, at the lower end thereof. The hydraulic leg comprises a multiplicity of stages, 93, wherein each stage withdraws into the previous stage. For example, in FIG. 8, the leg is fully extended with a first stage, 93a, a second stage, 93b, and a third stage, 93c, illustrated. As the leg is withdrawn the third stage is received within the second stage and the second stage is received by the first stage. The first stage is then received by the hydraulic leg, 92, thereby reducing the length of the leg as measured from the upper extent, 94. In FIGS. 9 and 10 the leg is shown in the withdrawn position as it would be visualized during storage, particularly on a raised platform, 80. The hydraulic leg is preferably attached to the platform or the rail. A handle, 5, is preferable attached the collapsible cart. In a particular embodiment the handle is attached to the hydraulic leg since the handle mountings, 95, provide a convenient conduit for control lines the purpose of which will be more fully explained below. In a particularly preferred embodiment the rail and hydraulic cylinder are integral and molded in a single unit. In another particularly preferred embodiment, the rail, hydraulic cylinder and handle are integral and molded as a single unit.

Figure 11:
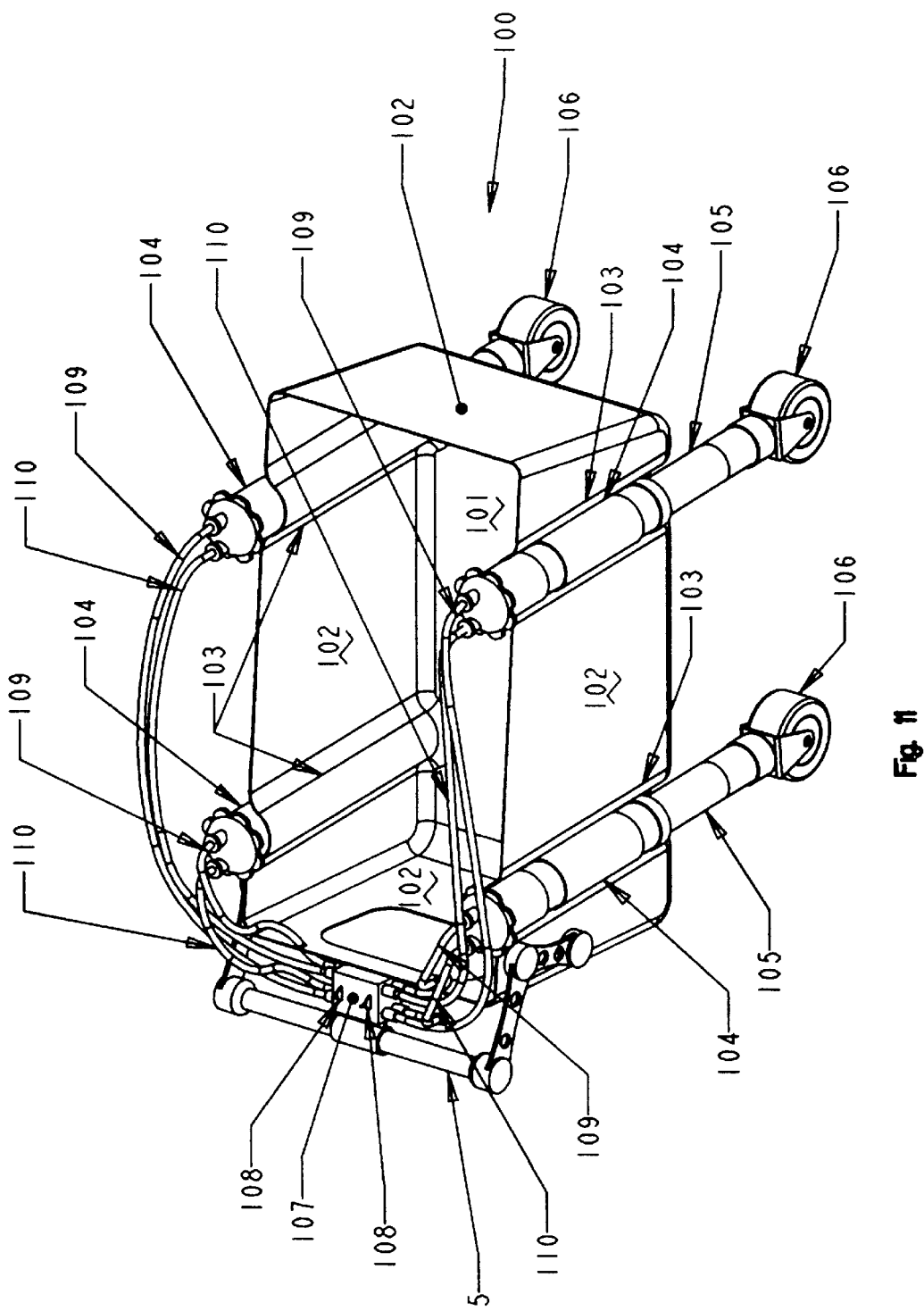
FIG. 11 is a top perspective view of an embodiment of the present invention.
Figure 12:
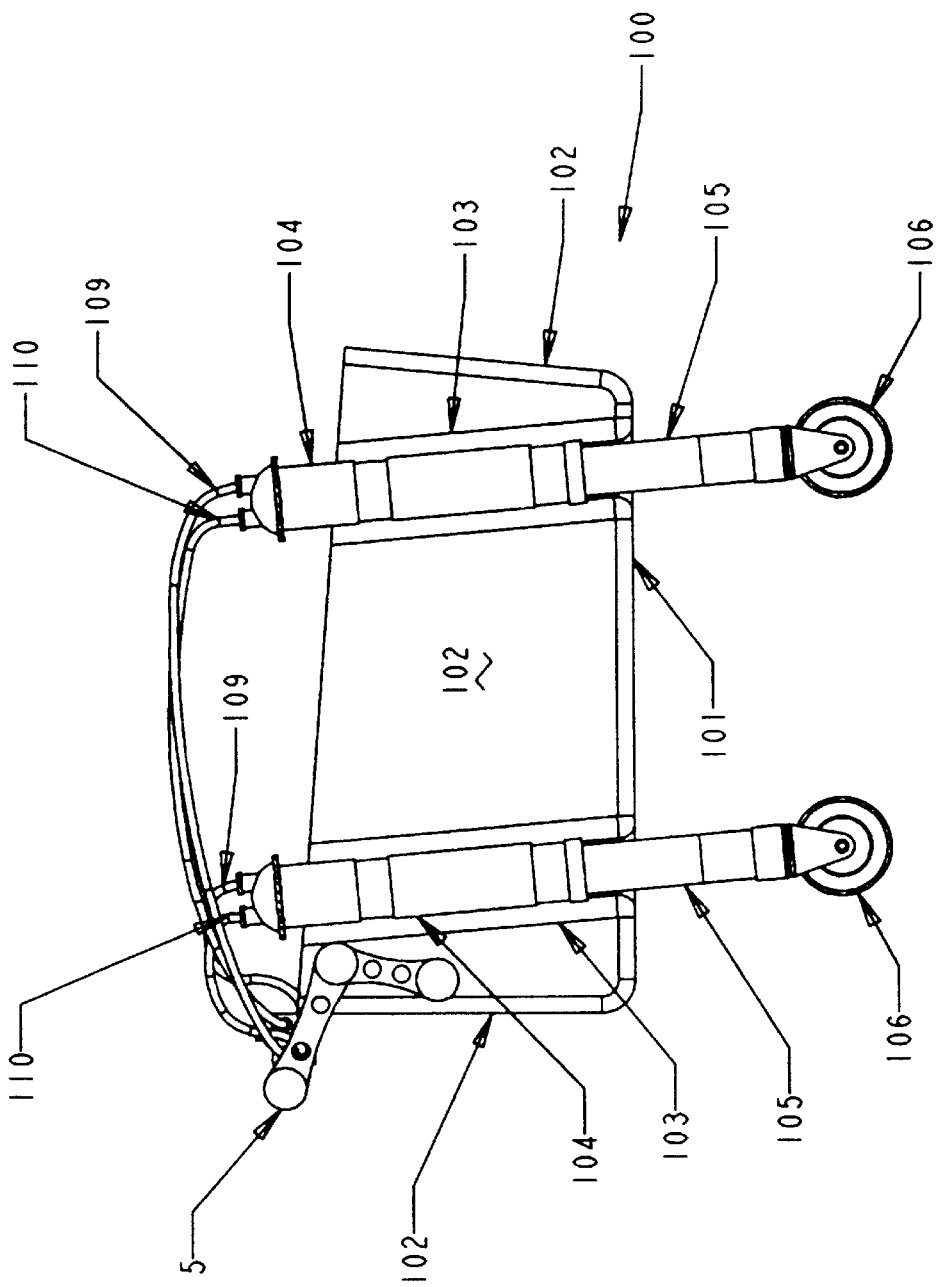
FIG. 12 is a side view of the embodiment of FIG. 11.

FIG. 12 is a side view of an embodiment of the present invention. FIG. 11 is a top perspective view of the embodiment illustrated in FIG. 12. The collapsible cart is generally represented at 100. The collapsible cart comprises a lower platform, 101. Integral to the lower platform are walls, 102. The lower platform and walls, taken together, form a basket within which materials can be carried. Opposing walls have molded therein receiving grooves, 103. Mounted in each receiving groove, 103, is a hydraulic cylinder, 104. A leg, 105, extends from and is received by the hydraulic cylinder in response to fluid flow within the hydraulic cylinder as well known in the art of hydraulics. Wheels, 106, are provided at the lower end of the leg, 105, to facilitate moving of the collapsible cart. Fluid, such as air, water, or an oil, enter into the hydraulic cylinder to extend the leg and is withdrawn from the cylinder to withdraw, or shorten, the leg. An actuator, 107, preferably attached to the handle, 5, controls the fluid flow. Buttons, 108, on the actuator cause fluid to enter into a lift line, 109, thereby extending the leg, or into the lower line, 110, thereby contracting the legs. Hydraulic actuators are well known and widely available commercially and further elaboration herein is not necessary. In a particularly preferred embodiment the lift lines, and lower lines, for matching legs are junctured such that the legs move in concert. For example, in a particularly preferred embodiment the lift lines of the front two legs are junctured and the lower lines of the front two legs are junctured such that the legs move up and down in concert. In another preferred embodiment the lift lines of the rear two legs are junctured and the lower lines of the rear two legs are junctured such that the legs move up and down in concert. In a particularly preferred embodiment the actuator comprises a button which causes the front legs to raise and lower in concert and a button which causes the rear legs to raise and lower in concert.

It would be well within the skill of an artisan to provide features not specifically described herein without departing from the scope of the invention. Adjustable legs could be provided by incorporating alternate attachment points on the legs, or cart, or by incorporating legs which are expandible as well known in the art. Other features could be incorporated such as a child seat, bag holders, trays, cases or other storage segment devices. Other methods of moving could be incorporated such as rollers, casters and the like without departing from the scope of the invention.

The invention has been describe with emphasis directed to the preferred embodiments. It would be apparent from the description herein that various embodiments could be developed without departing from the scope of the invention. Alternate methods of construction, operation and use could also be employed without departing from the scope of the invention which is set forth in the claims which follow.

What is claimed is:

1. A collapsible cart for transporting items from a first surface to a raised surface wherein said collapsible cart comprises:
    a platform comprising a front edge and, back edge;
        a collapsible front leg attached to said platform wherein said collapsible front leg comprises:
        a front upper leg;
        a front lower leg; and
            a front spring connected to said front upper leg and to said front lower leg and biased to rotate said front lower leg towards an extended position relative to said front upper leg;
        a front release mechanism for persuading said collapsible front leg to be withdrawn towards said platform;
        a collapsible rear leg attached to said platform wherein said collapsible rear leg comprises:
        a rear upper leg;
        a rear lower leg; and
            a rear spring connected to said rear upper leg and to said rear lower leg and biased to rotate said rear lower leg towards an extended position relative to said rear upper leg;
        a rear release mechanism for allowing said collapsible rear leg to be withdrawn towards said platform.

2. The collapsible cart of claim 1 wherein said raised surface is a vehicle.

3. The collapsible cart of claim 1 wherein said rear upper leg is pivotally attached to said platform and said rear lower leg is pivotally attached to said rear upper leg.

4. The collapsible cart of claim 3 wherein said rear release mechanism rotates said rear upper leg towards said front edge of said platform.

5. The collapsible cart of claim 4 wherein said rear lower leg rotates towards said back edge of said platform when said rear lower leg contacts said raised surface.

6. The collapsible cart of claim 1 wherein said front release mechanism causes said front upper leg to move towards said back edge of said platform.

7. The collapsible cart of claim 6 wherein when said front upper leg moves towards said back edge of said platform, said front upper leg rotates towards said front edge of said platform.

8. The collapsible cart of claim 7 wherein said front lower leg rotates towards said back edge of said platform when said front lower leg contacts said raised surface.

9. The collapsible cart of claim 1 further comprising rollers attached to said front edge of said platform.

10. A collapsible cart for transporting items to a raised surface comprising:
    a platform comprising a front edge and a back edge;
    a collapsible front leg attached to said platform wherein said collapsible front leg comprises:
        a front upper leg pivotally attached to said platform; and
        a front lower leg pivotally attached to said front upper leg;
    a front release mechanism for allowing said front upper leg to rotate towards said front edge with said front lower leg extended therefrom and wherein said front lower leg rotates opposite said front upper leg when said front lower leg contacts said raised surface;
    a collapsible rear leg attached to said platform wherein said collapsible rear leg comprises:
        a rear upper leg pivotally attached to said platform; and
        a rear lower leg pivotally attached to said rear upper leg;
    a rear release mechanism for allowing said rear upper leg to rotate towards said front edge of said platform with said rear lower leg extended therefrom and wherein said rear lower leg rotates opposite said rear upper leg when said rear lower leg contacts said raised surface; and
    said collapsible cart further comprises a front spring connected to said front upper leg and to said front lower leg and biased to rotate said front lower leg towards and extended relationship with said front upper lag.

11. The collapsible cart of claim 10 wherein said raised surface is a vehicle.

12. The collapsible cart of claim 10 wherein said front release mechanism further causes said front upper leg to move towards said back edge of said plat form.

13. The collapsible cart of claim 10 further comprising a rear spring connected to said rear upper leg and to said rear lower leg and biased to rotate said rear lower leg towards an extended relationship with said rear upper leg.

14. The collapsible cart of claim 13 Wherein said front release mechanism causes said front upper leg to move towards said back edge of said platform.

15. The collapsible cart of claim 14 wherein when said front upper leg moves towards said back edge of said platform, said front upper leg rotates towards said front edge of said platform.

16. The collapsible cart of claim 15 wherein said front lower leg rotates towards said back edge of said platform when said front lower leg contacts said raised surface.

17. The collapsible cart of claim 10 further comprising roller attached to said front edge of said platform.

18. A method for transporting items in a cart wherein said cart is capable of moving from a lower surface to a raised surface comprising the steps of:

a) pushing said cart towards said raised surface;

b) activating a controller for withdrawing a pair of front legs attached to said cart wherein said cart is partially supported on said raised surface and wherein said front legs comprises:

a front upper leg;

a front lower leg; and a front spring connected to said front upper leg and to said front lower leg and biased to rotate said front lower leg towards an extended position relative to said front upper leg;

c) pushing said cart further onto said raised surface; and d) activating a controller for withdrawing a pair of rear legs attached to said cart wherein said cart is supported by said raised surface.

\* \* \* \* \*